US012586335B2

(12) United States Patent
Purushwalkam Shiva Prakash et al.

(10) Patent No.: US 12,586,335 B2
(45) Date of Patent: Mar. 24, 2026

(54) SYSTEMS AND METHODS FOR RECONSTRUCTING A THREE-DIMENSIONAL OBJECT FROM AN IMAGE

(71) Applicant: Salesforce, Inc., San Francisco, CA (US)

(72) Inventors: Senthil Purushwalkam Shiva Prakash, Palo Alto, CA (US); Nikhil Naik, Mountain View, CA (US)

(73) Assignee: Salesforce, Inc., San Francisco, CA (US)

( * ) Notice: Subject to any disclaimer, the term of this patent is extended or adjusted under 35 U.S.C. 154(b) by 116 days.

(21) Appl. No.: 18/538,825

(22) Filed: Dec. 13, 2023

(65) Prior Publication Data

US 2024/0386685 A1    Nov. 21, 2024

Related U.S. Application Data

(60) Provisional application No. 63/502,872, filed on May 17, 2023.

(51) Int. Cl.
*G06T 19/20*        (2011.01)
*G06T 7/194*        (2017.01)
(Continued)

(52) U.S. Cl.
CPC ............. *G06T 19/20* (2013.01); *G06T 7/194* (2017.01); *G06T 7/50* (2017.01); *G06T 15/06* (2013.01); *G06T 15/205* (2013.01); *G06T 2207/10024* (2013.01); *G06T 2207/20081* (2013.01); *G06T 2207/20084* (2013.01);
(Continued)

(58) Field of Classification Search
None
See application file for complete search history.

(56) References Cited

U.S. PATENT DOCUMENTS

| | | |
|---|---|---|
| 11,748,940 B1 | 9/2023 | Xian et al. |
| 2022/0301252 A1 | 9/2022 | Wang et al. |

(Continued)

OTHER PUBLICATIONS

Junshu Tang, Tengfei Wang, Bo Zhang, Ting Zhang, Ran Yi, Lizhuang Ma, Dong Chen, "Make-It-3D: High-Fidelity 3D Creation from a Single Image with Diffusion Prior", Apr. 3, 2023, arXiv.org, arXiv:2303.14184v2.*

(Continued)

*Primary Examiner* — Robert Bader
(74) *Attorney, Agent, or Firm* — Haynes and Boone, LLP

(57)        ABSTRACT

Embodiments described herein provide a 3D generation system from a single RGB image of an object by inferring the hidden 3D structure of objects based on 2D priors learnt by a generative model. Specifically, the 3D generation system may reconstruct the 3D structure of an object from an input of a single RGB image and optionally an associated depth estimate. For example, a radiance field is formulated to depict the input image in one viewpoint of the target 3D object, based on which other viewpoints of the 3D object can be inferred. Based on the visible surface depicted by the input image, points between the reference camera and the surface are assigned with zero density, and points on the surface are assigned with high density and color equal to the corresponding pixel in the input image.

20 Claims, 11 Drawing Sheets

(51) Int. Cl.

*G06T 7/50*          (2017.01)

*G06T 15/06*        (2011.01)

*G06T 15/20*        (2011.01)

(52) U.S. Cl.

CPC .............. *G06T 2207/20092* (2013.01); *G06T 2207/30244* (2013.01); *G06T 2219/2012* (2013.01)

(56) References Cited

U.S. PATENT DOCUMENTS

2023/0260200 A1* 8/2023 Aroudj ..................... G06T 15/20
                                  345/418

2023/0298263 A1 9/2023 Yang et al.

2024/0378795 A1* 11/2024 Sato .......................... G06T 7/90

OTHER PUBLICATIONS

Ben Mildenhall, Pratul P. Srinivasan, Matthew Tancik, Jonathan T. Barron, Ravi Ramamoorthi, Ren Ng, "NeRF: Representing Scenes as Neural Radiance Fields for View Synthesis", Mar. 19, 2020, arXiv.org, arXiv:2003.08934v2.*

Congyue Deng, Chiyu Jiang, Charles R. Qi, Xinchen Yan, Yin Zhou, Leonidas Guibas, Dragomir Anguelov, "NeRDi: Single-View NeRF Synthesis with Language-Guided Diffusion as General Image Priors", Dec. 6, 2022, arXiv.org, arXiv:2212.03267v1.*

Thomas Müller, Alex Evans, Christoph Schied, Alexander Keller, "Instant Neural Graphics Primitives with a Multiresolution Hash Encoding", Jul. 22, 2022, ACM, ACM Transactions on Graphics (TOG), vol. 41, Issue 4, Article No. 102, pp. 1-15.*

Lily Goli, Daniel Rebain, Sara Sabour, Animesh Garg, Andrea Tagliasacchi, "nerf2nerf: Pairwise Registration of Neural Radiance Fields", Nov. 3, 2022, arXiv.org, arXiv:2211.01600v1.*

Luke Melas-Kyriazi, Christian Rupprecht, Iro Laina, Andrea Vedaldi, "RealFusion: 360° Reconstruction of Any Object from a Single Image", Feb. 23, 2023, arXiv.org, arXiv:2302.10663v2.*

Ben Poole, Ajay Jain, Jonathan T. Barron, Ben Mildenhall, "Dream Fusion: Text-to-3D using 2D Diffusion", Sep. 29, 2022, arXiv.org, arXiv:2209.14988v1.*

Ruilong Li, Hang Gao, Matthew Tancik, Angjoo Kanazawa, "NerfAcc: Efficient Sampling Accelerates NeRFs", May 8, 2023, arXiv.org, arXiv:2305.04966v1.

Xiuming Zhang, Pratul P. Srinivasan, Boyang Deng, Paul Debevec, William T. Freeman, Jonathan T. Barron, "NeRFactor: Neural Factorization of Shape and Reflectance Under an Unknown Illumination", Dec. 10, 2021, ACM, ACM Transactions on Graphics (TOG), vol. 40, Issue 6, Article No. 237, pp. 1-18.

* cited by examiner

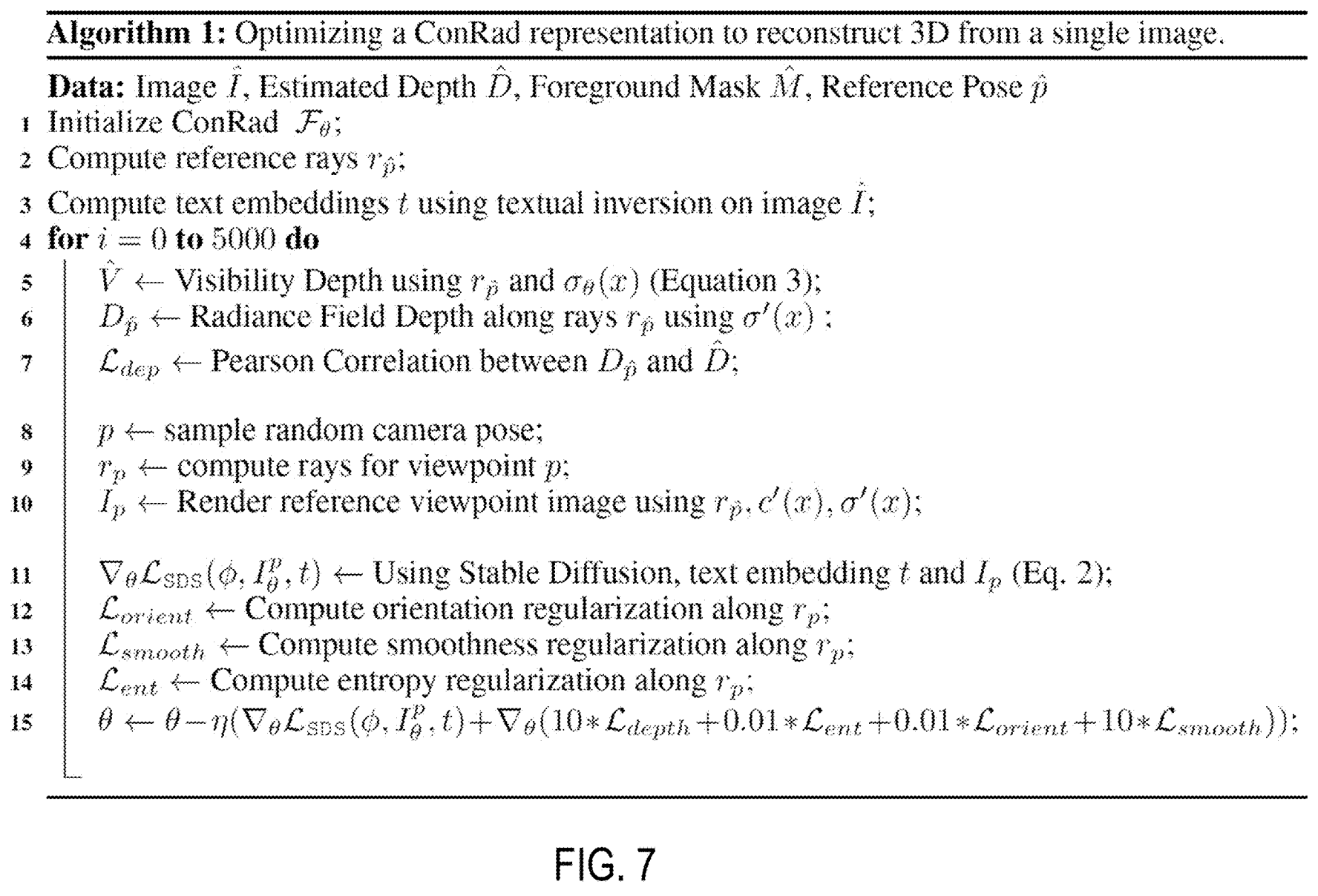

Algorithm 1: Optimizing a ConRad representation to reconstruct 3D from a single image.

Data: Image $\hat{I}$, Estimated Depth $\hat{D}$, Foreground Mask $\hat{M}$, Reference Pose $\hat{p}$ 1  Initialize ConRad $\mathcal{F}_\theta$;

2  Compute reference rays $r_{\hat{p}}$;

3  Compute text embeddings $t$ using textual inversion on image $\hat{I}$;

4  for $i = 0$ to 5000 do

5     $\hat{V} \leftarrow$ Visibility Depth using $r_{\hat{p}}$ and $\sigma_\theta(x)$ (Equation 3);

6     $D_{\hat{p}} \leftarrow$ Radiance Field Depth along rays $r_{\hat{p}}$ using $\sigma'(x)$ ;

7     $\mathcal{L}_{dep} \leftarrow$ Pearson Correlation between $D_{\hat{p}}$ and $\hat{D}$;

8     $p \leftarrow$ sample random camera pose;

9     $r_p \leftarrow$ compute rays for viewpoint $p$;

10    $I_p \leftarrow$ Render reference viewpoint image using $r_p$, $c'(x)$, $\sigma'(x)$ ;

11    $\nabla_\theta \mathcal{L}_{SDS}(\phi, I_\theta^p, t) \leftarrow$ Using Stable Diffusion, text embedding $t$ and $I_p$ (Eq. 2);

12    $\mathcal{L}_{orient} \leftarrow$ Compute orientation regularization along $r_p$;

13    $\mathcal{L}_{smooth} \leftarrow$ Compute smoothness regularization along $r_p$;

14    $\mathcal{L}_{ent} \leftarrow$ Compute entropy regularization along $r_p$;

15    $\theta \leftarrow \theta - \eta(\nabla_\theta \mathcal{L}_{SDS}(\phi, I_\theta^p, t) + \nabla_\theta(10 * \mathcal{L}_{depth} + 0.01 * \mathcal{L}_{ent} + 0.01 * \mathcal{L}_{orient} + 10 * \mathcal{L}_{smooth}))$;

FIG. 7

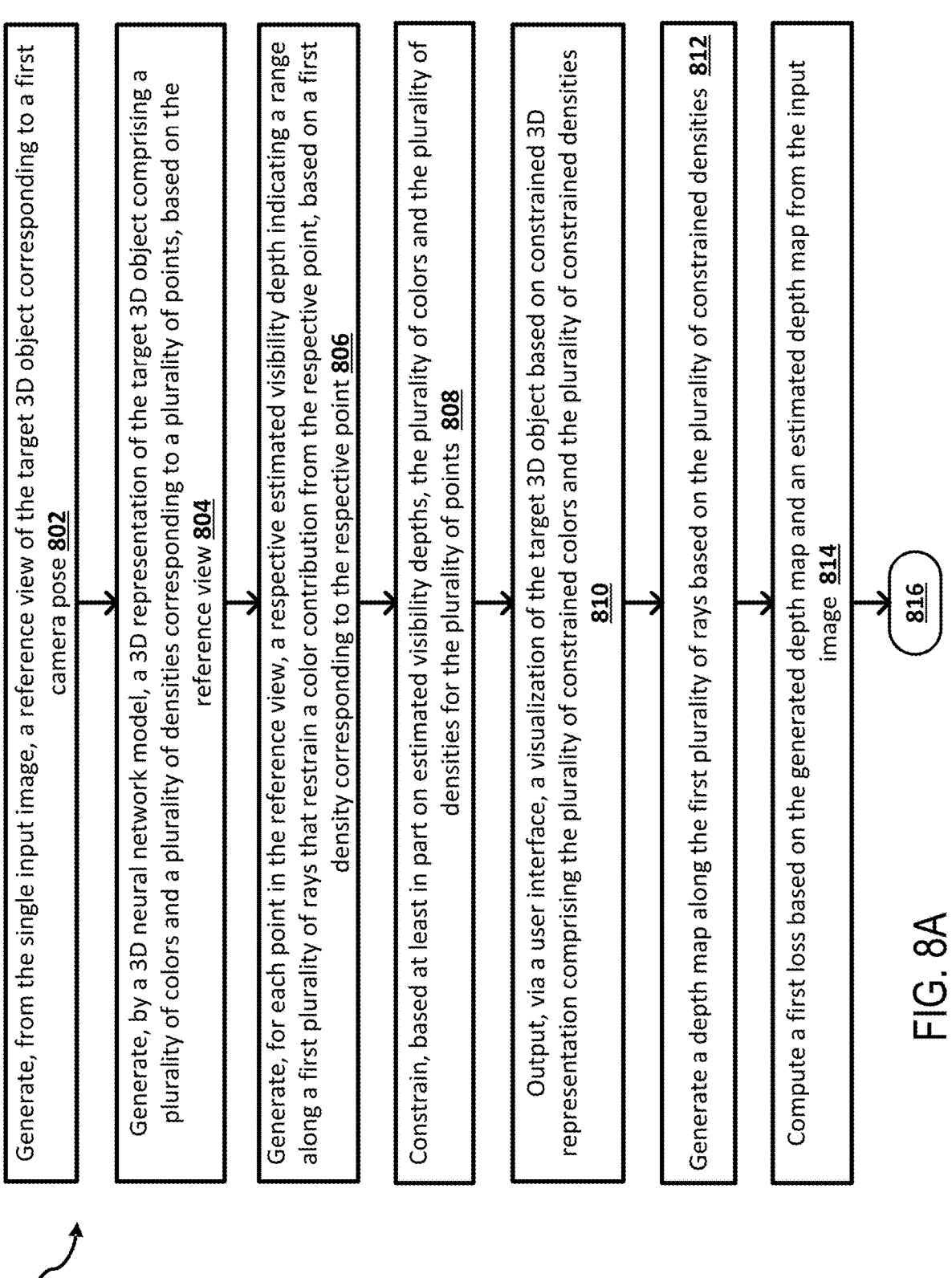

800

Generate, from the single input image, a reference view of the target 3D object corresponding to a first camera pose 802

Generate, by a 3D neural network model, a 3D representation of the target 3D object comprising a plurality of colors and a plurality of densities corresponding to a plurality of points, based on the reference view 804

Generate, for each point in the reference view, a respective estimated visibility depth indicating a range along a first plurality of rays that restrain a color contribution from the respective point, based on a first density corresponding to the respective point 806

Constrain, based at least in part on estimated visibility depths, the plurality of colors and the plurality of densities for the plurality of points 808

Output, via a user interface, a visualization of the target 3D object based on constrained 3D representation comprising the plurality of constrained colors and the plurality of constrained densities 810

Generate a depth map along the first plurality of rays based on the plurality of constrained densities 812

Compute a first loss based on the generated depth map and an estimated depth map from the input image 814

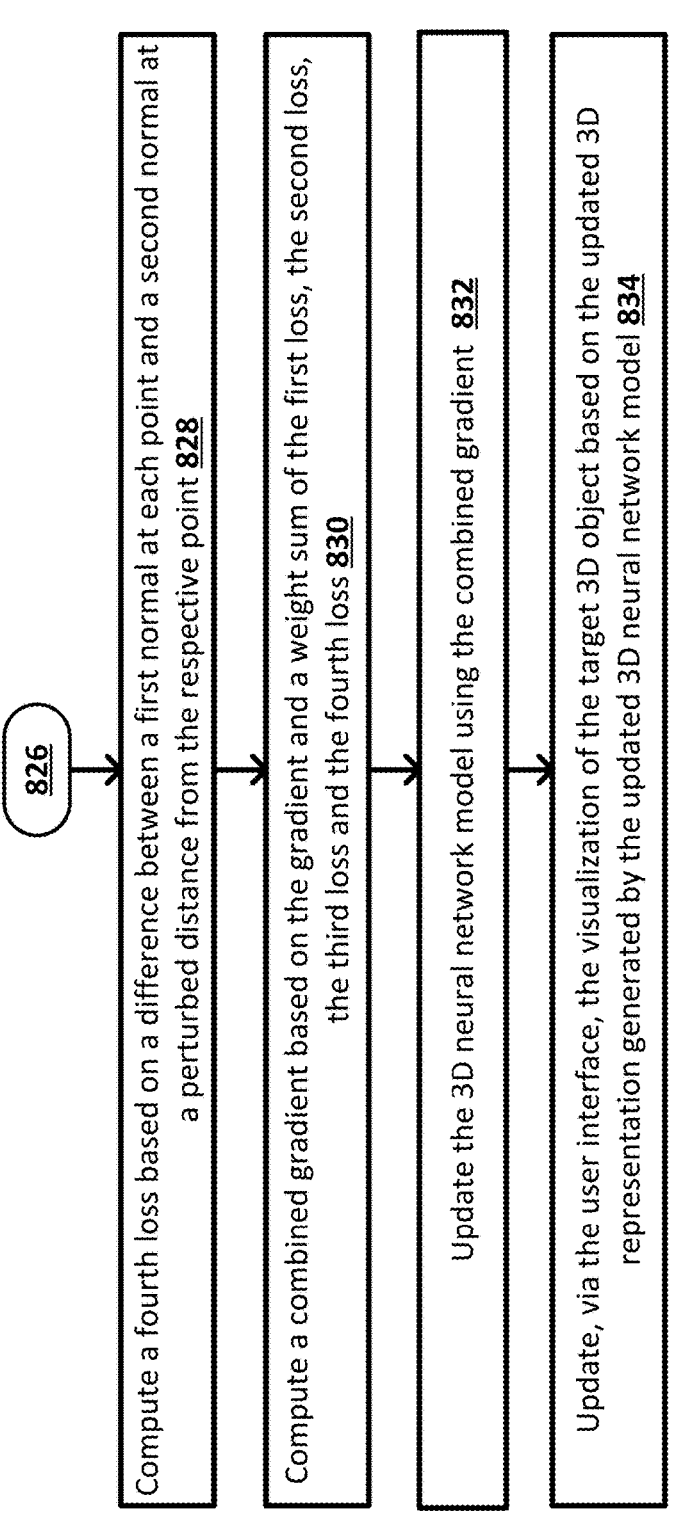

826

Compute a fourth loss based on a difference between a first normal at each point and a second normal at a perturbed distance from the respective point 828

Compute a combined gradient based on the gradient and a weight sum of the first loss, the second loss, the third loss and the fourth loss 830

Update the 3D neural network model using the combined gradient 832

Update, via the user interface, the visualization of the target 3D object based on the updated 3D representation generated by the updated 3D neural network model 834

FIG. 8C

| Method | All Views | | | Near Reference | | |
|---|---|---|---|---|---|---|
| | $d_{ref}$ | $d_{all}$ | $d_{oracle}$ | $d_{ref}$ | $d_{all}$ | $d_{oracle}$ |
| PointE | 0.496 | 0.482 | 0.453 | 0.496 | 0.499 | 0.399 |
| RealFusion | 0.495 | 0.486 | 0.460 | 0.483 | 0.482 | 0.464 |
| NeuralLift-360 | 0.528 | 0.516 | 0.498 | 0.543 | 0.544 | 0.534 |
| ConRad | 0.332 | 0.316 | 0.273 | 0.286 | 0.257 | 0.230 |

FIG. 9

SYSTEMS AND METHODS FOR RECONSTRUCTING A THREE-DIMENSIONAL OBJECT FROM AN IMAGE

CROSS REFERENCE

The application is a nonprovisional of and claims priority under 35 U.S.C. 119 to U.S. provisional application No. 63/502,872, filed May 17, 2023.

The application is related to co-pending and commonly-owned U.S. nonprovisional application Ser. No. 18,538,814, filed on the same day.

All of the above mentioned applications are hereby expressly incorporated by reference herein in their entirety.

TECHNICAL FIELD

The embodiments relate generally to natural language processing and machine learning systems, and more specifically to systems and methods for reconstructing a three-dimensional (3D) object from a two-dimensional (2D) image.

BACKGROUND 3D reconstruction refers to the process of creating a 3D representation of an object or a scene from 2D data. 3D reconstruction techniques has numerous applications in various fields. For example, in computer vision and robotics, 3D reconstruction plays a crucial role in object recognition, tracking, and scene understanding, which enables robots and autonomous systems to perceive and interact with the 3D world, aiding in navigation, manipulation, object detection, and/or the like. For another example, in virtual reality (VR) and/or augmented reality (AR) applications, 3D reconstruction techniques create immersive virtual and augmented reality experiences, which allows for the creation of realistic 3D virtual environments, virtual objects, and avatars that can be interacted with in real-time. For another example, in medical imaging, 3D reconstruction techniques are used to generate detailed anatomical models from MRI, CT, or ultrasound scans. This aids in diagnosis, surgical planning, and patient-specific treatment.

BRIEF DESCRIPTION OF THE DRAWINGS

FIG. 7 is a simplified block diagram illustrating an example pseudo-code segment for optimizing an image constrained 3D representation using the framework in FIG. 2, according to embodiments described herein.

FIGS. 8A-8C provides an example logic flow diagram illustrating a method of 3D object reconstruction using a single input image of a target 3D object shown in FIGS. 1-7, according to some embodiments described herein.

FIG. 9 provides a performance chart comparing the image constrained radiance fields with existing 3D representations, according to embodiments described herein.

Figure 1:
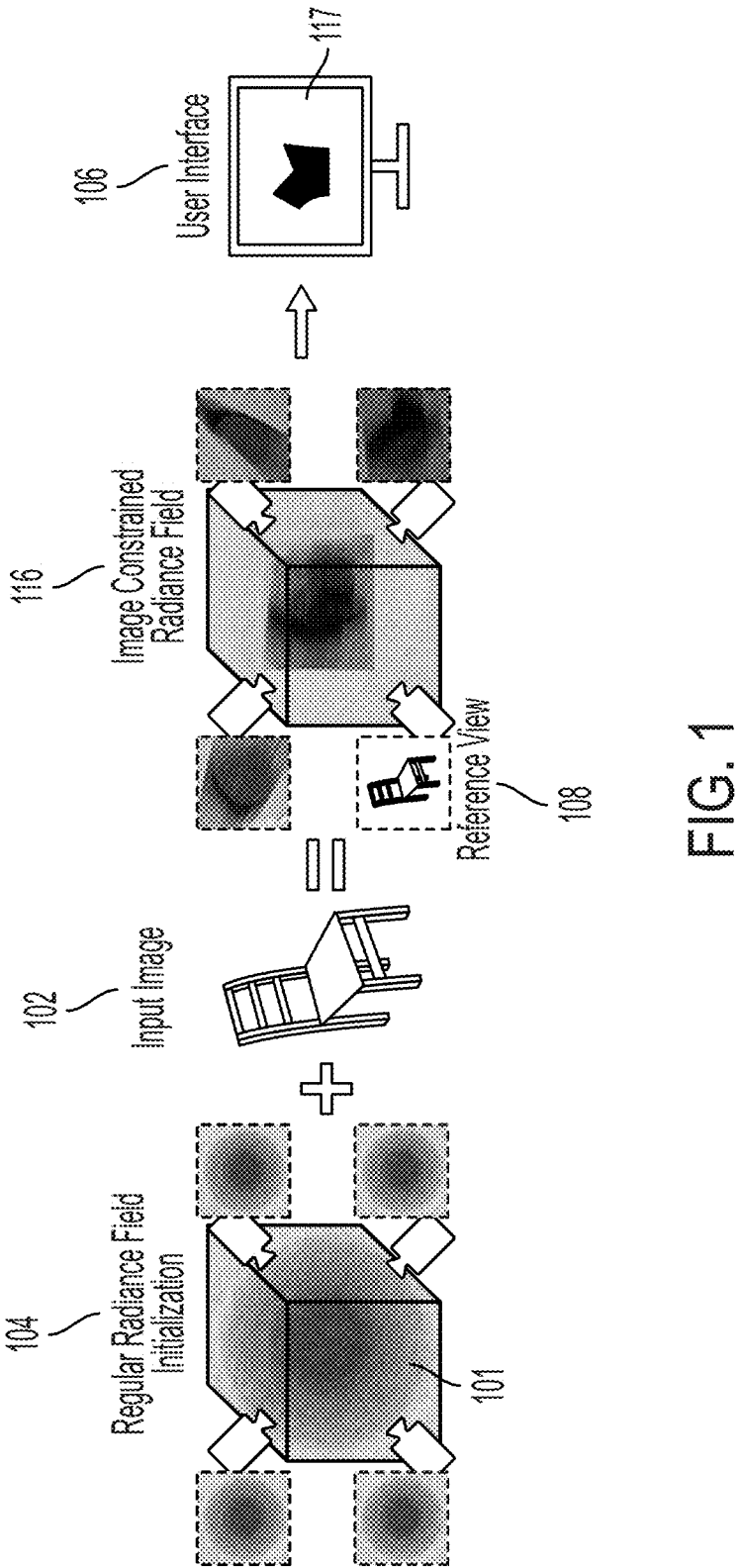
FIG. 1 is a simplified diagram illustrating aspects of 3D reconstruction using inference from a single 2D image, according to some embodiments.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Traditional 3D reconstruction systems often involve capturing or acquiring multiple 2D images or measurements from different viewpoints or using other sensing techniques, and then using computational algorithms to combine and analyze the data to generate a 3D model. However, existing techniques still struggle to make inferences beyond the visual data captured by sensors or cameras. Capturing full 3D data in the real world can often be costly and technically challenging, 3D reconstruction technology is thus generally limited to dealing with Red-Green-Blue (RGB) or Red-Green-Blue Depth (RGB-D) data. Thus, limited availability, or rather the lack of accurate RGB or RGB-D data of a 3D object has largely hindered the performance of 3D reconstruction, and sometimes 3D reconstruction may not even be feasible.

In view of the need for an efficient and scalable 3D reconstruction system, embodiments described herein provide a 3D generation system from a single RGB image of an object by inferring the hidden 3D structure of objects based on 2D priors learnt by a generative model. Given an input image and a chosen arbitrary reference camera pose, the 3D generation system utilizes multiple constraints to incorporate the appearance of the object and the estimated foreground mask into the color and density fields of 3D representation of the object, respectively. These constraints ensure that the rendering of the radiance field from the chosen viewpoint exactly matches the input image while allowing the remaining viewpoints to be optimized.

In one embodiment, the 3D generation system may generate a 3D representation comprising colors and densities corresponding to 3D spatial location coordinates by the radiance field method. For example, a neural network may encode a 3D scene as a volumetric function, and then predict a volume density, and view-dependent emitted radiance given the 3D spatial location coordinates and viewing direction in Euler angles of a camera pose. The 3D representation may be constrained by the one viewpoint of the target 3D object shown in the input image, based on which other viewpoints of the 3D object can be inferred. Based on the visible surface depicted by the input image, points between the reference camera and the surface are assigned with zero density, and points on the surface are assigned with high density and color equal to the corresponding pixel in the input image. In addition, the radiance field is used to obtain an estimate of the depth map, and the observations are in turn incorporated into the color of the radiance field so as to use the input image as a constraint for inferring 3D space around the target object.

In this way, because the 3D representation accounts for the reference view of the target 3D object from the input image, the 3D generation system may generate a 3D representation that depicts a target 3D object that are consistently faithful to the input image. The resulting 3D reconstructions also exhibit superior high quality compared with existing 3D generation systems as shown in FIG. Therefore, 3D imaging technology has been improved.

FIG. 1 is a simplified diagram illustrating aspects of 3D reconstruction using inference from a single 2D image, according to some embodiments. In one embodiment, for a target 3D object 101, 3D representations 104, known as radiance field, may be generated. Specifically, a neural network may be used approximate the mapping from 3D coordinates to radiance values (which represent the color and densities of light) in a scene. The radiance fields 104 may be used for the generation of realistic and detailed images of the 3D object 101 from different viewpoints.

For example, the radiance field initialization 104 may comprise a Neural Radiance Field (NERF), which is a parametric representation of a 3D scene as a continuous volume of emitted color c and density $\sigma$, written as a mapping $\mathcal{F}_\theta$: $(x) \rightarrow (c(x), \sigma(x))$ from the 3D coordinates of a point x, to it's associated color and density. These radiance field allow rendering of 2D images by accumulating color over points sampled on camera rays. For a camera ray $r(t)=o+td$, the accumulated color is expressed as:

$$C(r) = \int_t T(t)\sigma(r(t))c(r(t))dt \qquad (1)$$

where $T(t)=\exp(-\int_0^t \sigma(r(s))ds$ is the accumulated transmittance of the volume along the ray. Traditionally, training a neural network to generate an accurate representation $\mathcal{F}_\theta$ of a 3D scene generally requires supervision in the form of several ground truth samples of C(r), e.g., several images of a scene taken from different viewpoints. But such ground-truth 3D samples may be scarce or costly to obtain.

As shown in FIG. 1, an input image 102 depicting the 3D object 101 (e.g., a chair) from a viewpoint may be used to condition the radiance fields 104. Information contained in the input image 102 may be used to improve the 3D radiance field $\mathcal{F}_\theta$ to capture the visible appearance and geometry of an object 101 depicted in an input image 102, while inferring a realistic reconstruction of the unknown/hidden parts.

In one embodiment, the input image 102 may be represented by $\hat{I}$ and $\hat{p}$ be a reference camera pose (which can be arbitrarily chosen) associated with the image 102. If $I_\theta^p$ denotes an image obtained as a differentiable rendering of 3D representation $\mathcal{F}_\theta$ viewed from camera pose p, the desired $\mathcal{F}_{\hat{\theta}}$ should satisfy two criteria: (i) $I_\theta^{\hat{p}}=\hat{I}$ (e.g., the rendered image at the same reference image pose should be the same as the input image); and (ii) for all viewpoints p, $I_\theta^p$ should be semantically and geometrically consistent—in other words, pixels of other rendered images from different viewpoints should have the same characteristics of the pixels in the input image 102 if such pixels correspond to the same points in a 3D scene.

In one embodiment, the original radiance field representation 104 comprising the colors and densities may thus be revised based on the reference view 108 of the "chair." For example, based on the visible surface of the "chair" depicted by the reference view 108, points between the reference camera and the visible surface are assigned with zero density, and points on the surface are assigned with high density and color equal to the corresponding pixel in the reference view 108. A reference view 108 of the 3D object "chair", e.g., a known viewpoint from which the "chair" or scene of "chair" is observed, may be generated from the input image 102. If the ray corresponding to pixel (i, j) in the reference view 108 is denoted by $r_{\hat{p}}^{(i,j)}$ $(t)=o_{\hat{p}}$ $+td_{\hat{p}}^{(i,j)}$. A visibility depth of this pixel $V_{\hat{p}}[i, j]$ may be computed as the value of t such that $$1 - \frac{\int_0^t T(f)\sigma\left(r_p^{(i,j)}(t)\right)}{\int_{s=0}^\infty T(s)\sigma\left(r_p^{(i,j)}(s)\right)} = \eta \qquad (2)$$

where $\eta$ is a small value, e.g., setting to 0.1, etc. In this way, the visibility depth for each pixel is a point on the ray beyond which the contribution of color is minimal (e.g., less than 10%).

Figure 2:
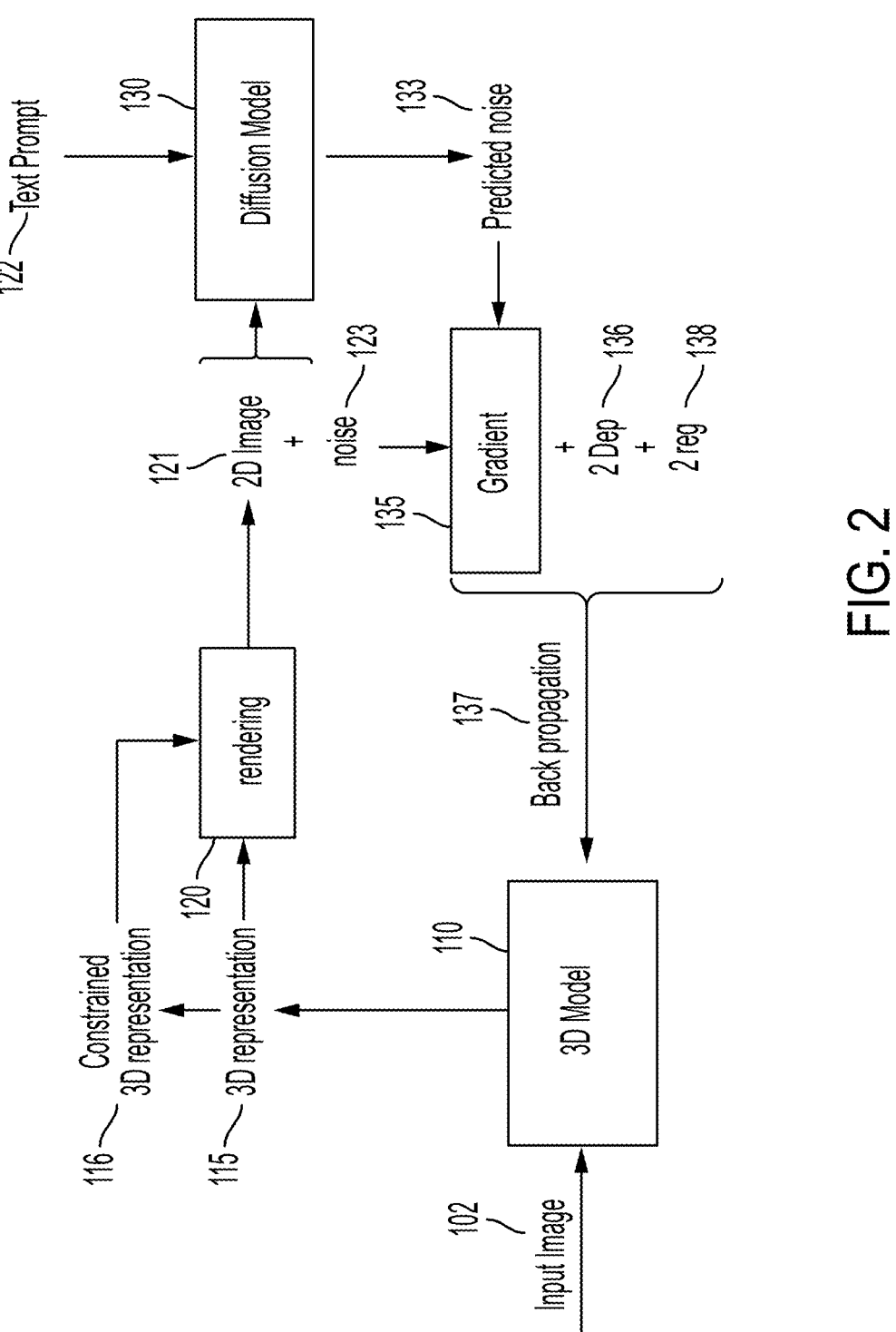
FIG. 2 is a simplified diagram illustrating a 3D generation training framework for training one or more neural networks to generate the image constrained radiance fields described in FIG. 1, according to one or more embodiments described herein.

In one embodiment, if $Q_p$: $\mathbb{R}^3 \rightarrow [-1, 1] \times [-1, 1]$ denotes the camera projection matrix corresponding to projection from world coordinates to the normalized reference image coordinates, the color c (x) of the radiance field $\mathcal{F}_\theta$ 104 may be formulated as follows:

$$v_x = \mathbb{1}\left(\|x - o_{\hat{p}}\| < V_{\hat{p}}[Q_{\hat{p}}(x)]\right) \qquad (3)$$

$$c'(x) = v_x * I^{\hat{p}}\left(Q_{\hat{p}}(x)\right) + (1 - v_x) * c(x) \qquad (4)$$

where bilinear interpolation is used to compute pixel values $I^{\hat{p}}(Q_{\hat{p}}(x))$. This constraint enforces the appearance of the reference viewpoint to explicitly match the input image 102. Here the depth of each pixel is estimated based on a potentially incorrect density field, all points in between the camera and the estimated surface along the ray should have color equal to the corresponding pixel. This still constrains the reference view 108 to match the input image 102 but allows the density to be optimized through training as shown in FIG. 2.

In one embodiment, the foreground mask of the input image 102 informs the density of the radiance field. A binary foreground mask $\hat{M}$ of the input image 102 is generated using a pretrained foreground estimation method. Because any point on the reference rays corresponding to the background pixels should have zero density, the density $\sigma(x)$ may be computed as:

$$m_x = \hat{M}[Q_{\hat{p}}(x)] \qquad (5)$$

$$\sigma'(x) = m_x * \sigma(x) \qquad (6)$$

Thus, the image constrained radiance field 116 comprising the constrained color c'(x) and density $\sigma'(x)$ may be obtained this way. In this way, the resulting image constrained radiance field 116 are conditioned on the input image 102 such that the constrained 3D representation of the "chair" in which the colors in the constrained fields 116 are consistent with colors of corresponding pixels in the reference view 108.

In one implementation, a scalar $\alpha$ may be applied to the visibility score $v_x$ and the mask score $m_x$. The scalar may be linearly annealed from 0 to 1 over the first 50% of the updates and then kept constant at 1.

In one embodiment, the generated 3D representation, e.g., image constrained radiance fields 116 may be visualized via a user interface 106. For example, the visualization 117 of target 3D object 101 "chair" may be rendered as a plurality of viewpoint images of the target 3D object 101 based on the image constrained radiance field 116, and a plurality of user-selected camera poses. Specifically, a user may interactively select a viewpoint or a camera pose (e.g., by moving a mouse, or any other controlling means), and a two-dimensional (2D) image of the target 3D object may be rendered. The visualization 117 may interactively evolve, e.g., by rendering another 2D image from a different camera pose as the user selects another viewpoint.

FIG. 2 is a simplified diagram illustrating a 3D generation training framework for training one or more neural networks to generate the image constrained radiance fields 116 described in FIG. 1, according to one or more embodiments described herein. In one embodiment, 3D neural network training framework may comprise a 3D model 110 to be trained to generate a 3D representation based on an input image of a target 3D object, a rendering module 120, a diffusion model 130, a gradient module 135, a depth loss module 136 and a regularization loss module 138.

In one embodiment, 3D model 110 may generate 3D representation 115 based on an input image 102. For example, 3D model 110 may comprise a shared multi-resolution hash encoding of Instant-NGP and two separate small multi-layer perceptrons (MLPs) to generate the unconstrained color c(x) and density $\sigma(x)$ respectively. For the multi-resolution hash encoding of Instant-NGP representation, 16 levels with a 2-dimensional encoding at each level may be used. The Instant-GP encoding is passed to two 3-layer MLPs with a hidden dimension of 64. The color MLP output is passed through a sigmoid activation to obtain the RGB values additionally. The density MLP output is passed to the exponential ex activation to obtain the density value.

The 3D representation 115 may then be constrained by the reference view generated from input image 102 as described in FIG. 1, to result in constrained 3D representation 116

(e.g., image constrained radiance fields 116 comprising the constrained color c'(x) and density $\sigma'(x)$).

In one embodiment, rendering module 120 may render the constrained 3D representation 116 into one or more two-dimensional (2D) images 121, e.g., using a randomly sampled camera pose such as a camera azimuth, a camera elevation, a camera field-of-view, a lighting direction, and/or the like. Additional rendering parameters may include binary choices between a black and white or colored background, shade, albedo, and/or the like. The rendered 2D image 121 may be injected with a noise term 123 to result in a noisy image, which may be fed to a pretrained diffusion model 130.

In one embodiment, the diffusion model 130 synthesizes images by iteratively denoising the input noisy image from a Gaussian distribution to generate a predicted noise 133 according to a text prompt 122, e.g., "a photo of chair" corresponding to the target 3D object "chair." For example, diffusion model 130 may be a text conditioned diffusion model. A text prompt 122 such as a caption "a photo of a <token>" where the embedding of the special token is inferred using Textual Inversion. In order to learn an embedding that accurately captures the input image, multiple synthetically generated augmentations of the input image 102 may be passed by randomly cropping, resizing and blurring the input image 102.

In one implementation, the diffusion model 130 has been pretrained by added noise to a real training image I iteratively for T timesteps to synthesize training data $\{I_0, I_1, \ldots, I_T\}$. Specifically, the noised image for timestep t can be computed as $I_t = \sqrt{\alpha_t}I + \sqrt{1-\alpha_t}\epsilon$ where $\epsilon \in \mathcal{N}(0, 1)$ and $\alpha_t$ is predefined noising schedule. This data is used to a train a denoising model $\hat{\epsilon}_\phi(I_t, y, t)$ which estimates the noise e using the noisy image $I_t$, the timestep t and an optional embedding y of the caption associated with the image. The resulting pretrained diffusion model 130 is then used to synthesize images by following the inverse process. First, a noise sample $I_T$ is drawn from $\mathcal{N}(0, 1)$. Then $\hat{\epsilon}_\phi$ is iteratively used to estimate the sequences of images $\{I_{T-1}, I_{T-2}, \ldots, I_0\}$ where $I_0$ is the finally synthesized image. In this way, the diffusion model 130 "denoises" the input noisy image of the rendered 2D image 121 with injected random noise 123 into a predicted noise 133.

Therefore, given the randomly sampled camera pose p used to render 2D image 121, and images from the radiance field for these viewpoints $I_\theta^p$, the gradient module 135 may compute a gradient of the Score Distillation Sampling (SDS) objective $\mathcal{L}_{SDS}$ is defined as:

$$\nabla_\theta \mathcal{L}_{SDS}(\phi, I_\theta^p, y) = \mathbb{E}_{t,\epsilon}\left[w(t)\left(\hat{\epsilon}_\phi\left(\sqrt{\alpha_t}I_\theta^p + \sqrt{1-\alpha_t}\epsilon, y, t\right) - \epsilon\right)\nabla_\theta I_\theta^p\right] \qquad (7)$$

where $\theta$ represents one or more parameters of 3D model 110; $\Phi$ represents one or more parameters of diffusion model 130; w(t) represents a weighting unction that depends on timestep t for diffusion at diffusion model 130; at represents predefined noising schedule; y represents text prompt 102. In at least one embodiment, the expectation in computing gradient 135 may be estimated by using stratified sample parameters 136, such as (for example and without limitation), any rendering parameters 121, noise term 123, timestep for diffusion used in diffusion model 130, prompt, and/or the like.

This SDS gradient may be used to update 3D model 110 via backpropagation 137. In one implementation, each update is computed using a randomly sampled timestep t and noise sample $\epsilon$. This may be equivalent to first perturbing the rendered image 121 using $\epsilon$, t and then updating the radiance field of 3D model 110 using the difference between the diffusion model estimated noise 133 and injected noise $\epsilon$ 123.

In one embodiment, in addition to the SDS gradient, 3D model 110 may be trained using supervisory signals from the input image 102. For example, a depth map $\hat{D}$ may be estimated based on the input image 102. The depth loss module 136 may thus compute the estimated reference view depth $D_{\hat{p}}$ using the precomputed rays and radiance field density $\sigma'(x)$ and then compute a depth loss $L_{dep}$ as the Pearson Correlation coefficient between $D_{\hat{p}}$ and $\hat{D}$.

In one embodiment, the regularization loss module 138 may compute regularizations to produce coherent objects. For example, the radiance field may be trained to have either very low or very high density at any point along the rays by using the following entropy regularizer:

$$\mathcal{L}_{ent} = \sum_x -\alpha(x) * \log \alpha(x) - (1 - \alpha(x)) \log (1 - \alpha(x)) \qquad (8)$$

Where $\alpha(x)$ is the rendering weight at point x.

For another example, the regularization loss module 138 may compute a loss to force the surface normals in each rendered view to point towards the camera using the orientation regularizer:

$$\mathcal{L}_{orient} = \sum_x \alpha(x) * \max\left(<n(x), d>, 0\right)^2 \qquad (9)$$

where n is the normal at the point x computed using the finite differences method with the density $\sigma(x)$ and d is the viewing direction.

For another example, the regularization loss module 138 may compute a loss that encourages the smoothness of normals computed at each point along the rays using the smoothness regularizer:

$$\mathcal{L}_{smooth} = \sum_x \|n(x) - n(x + \delta)\| \qquad (10)$$

where $\delta$ is a random perturbation for each point with a maximum perturbation of 0.01 along each axis.

In one embodiment, the losses may be used to jointly update 3D model 110 via backpropagation path 137:

$$\mathcal{L} = \mathcal{L}_{SDS} + 10 * \mathcal{L}_{depth} + 0.01 * \mathcal{L}_{ent} + 0.01 * \mathcal{L}_{orient} + 10 * \mathcal{L}_{smooth} \qquad (11)$$

In one embodiment, the 3D generation and training framework described in FIGS. 1-2 may also be used to generate 3D model from one or more text prompts. For example, a pretrained text-to-image (e.g., Stable Diffusion, etc.) model may be used to first generate a 2D image from the text prompt describing an object. The generated 2D image may then serve as the input image 102 to generate a 3D reconstruction of this object using the 3D generation and training framework described in FIGS. 1-2.

Figure 3:
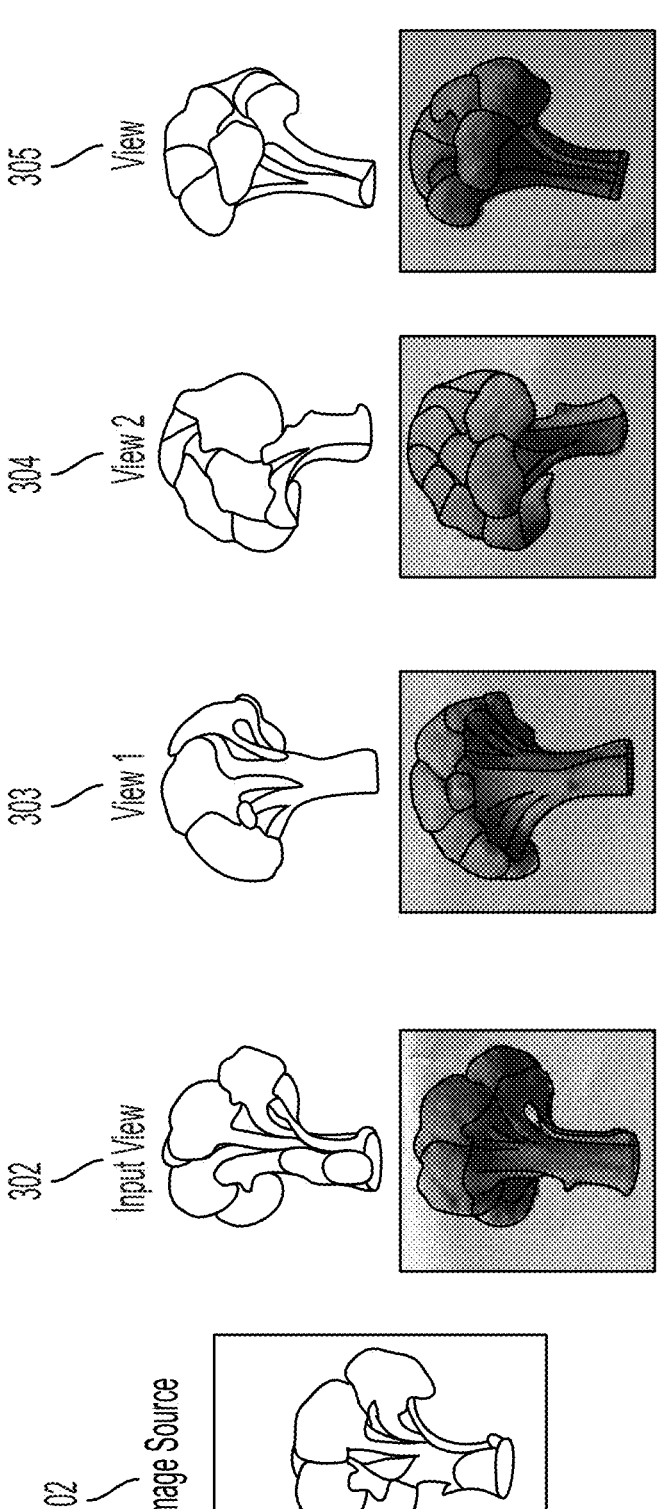
FIG. 3 is a simplified diagram illustrating an input image, an input reference view and the generated 3D views using the 3D generation framework described in FIGS. 1-2, according to one or more embodiments described herein.

FIG. 3 is a simplified diagram illustrating an input image 102, an input reference view 302 and the generated 3D views using the 3D generation framework described in FIGS. 1-2, according to one or more embodiments described herein. For example, given an input image 102 of a 3D object "broccoli," the RGB and surface normal of a reference view 302 of the "broccoli" may be generated. The RGB and surface normal reconstructions of three rendered viewpoints 303-305 from the constrained 3D representation (e.g., 116 in FIGS. 1-2) generated from the reference view 302 are shown. It is shown that the final representation 303-305 accurately reconstructs the input viewpoint 302 due to the constraints incorporated in the radiance field 3D representation. Furthermore, the constructed viewpoints 303-305 depict a realistic reconstruction of the input object "broccoli."

It is observed that the reconstructions are faithful to the specific instance of the object, presenting a smooth transition from reference viewpoint 302 to unobserved viewpoints 303-305. This can be attributed to two aspects of the model: (i) The textual inversion embedding passed to the diffusion model 130 captures the details of the object and (ii) the constrained 3D representation 116 depicts the input image accurately from beginning of training, it provides a strong prior for the appearance for the diffusion model 130, especially around the reference viewpoint 302. For example, reconstructed viewpoint 303 presents a viewpoint close to the reference view 302.

Figure 4:
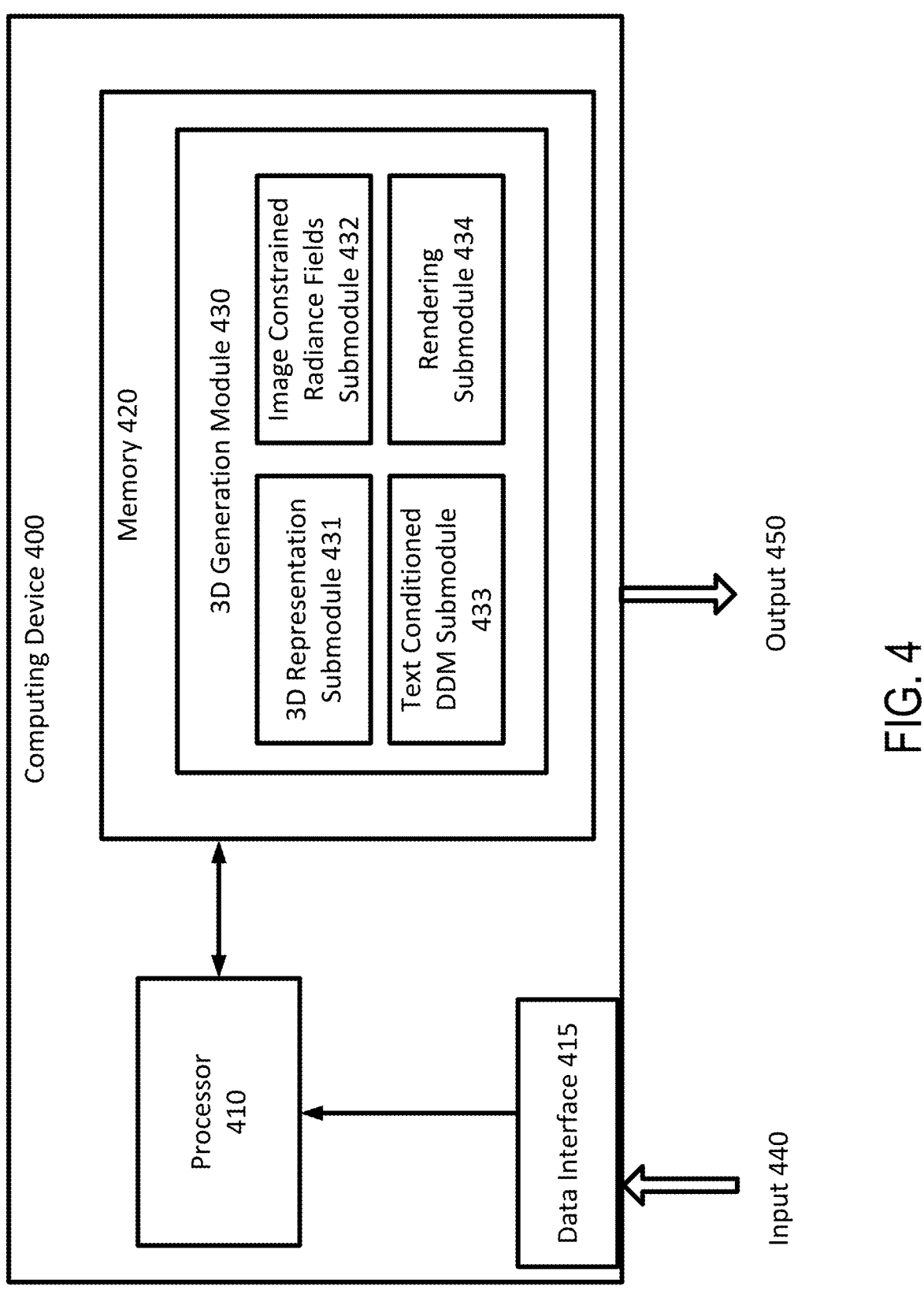
FIG. 4 is a simplified diagram illustrating a computing device implementing the 3D reconstruction system described in FIGS. 1-3, according to one embodiment described herein.

FIG. 4 is a simplified diagram illustrating a computing device implementing the 3D reconstruction system described in FIG. 1, according to one embodiment described herein. As shown in FIG. 4A, computing device 400 includes a processor 410 coupled to memory 420. Operation of computing device 400 is controlled by processor 410. And although computing device 400 is shown with only one processor 410, it is understood that processor 410 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 400. Computing device 400 may be implemented as a stand-alone subsystem, as a board added to a computing device, and/or as a virtual machine.

Memory 420 may be used to store software executed by computing device 400 and/or one or more data structures used during operation of computing device 400. Memory 420 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 410 and/or memory 420 may be arranged in any suitable physical arrangement. In some embodiments, processor 410 and/or memory 420 may be implemented on a same board, in a same package (e.g., system-in-package), on a same chip (e.g., system-on-chip), and/or the like. In some embodiments, processor 410 and/or memory 420 may include distributed, virtualized, and/or containerized computing resources. Consistent with such embodiments, processor 410 and/or memory 420 may be located in one or more data centers and/or cloud computing facilities.

In some examples, memory 420 may include non-transitory, tangible, machine readable media that includes executable code that when run by one or more processors (e.g., processor 410) may cause the one or more processors to perform the methods described in further detail herein. For example, as shown, memory 420 includes instructions for 3D Generation module 430 that may be used to implement and/or emulate the systems and models, and/or to implement any of the methods described further herein. 3D generation module 430 may receive input 440 such as an input image of a 3D object, via the data interface 415 and generate an output 450 which may be data representing the visuals of a target 3D object.

The data interface 415 may comprise a communication interface, a user interface (such as a voice input interface, a graphical user interface, and/or the like). For example, the computing device 400 may receive the input 440 (such as a training dataset of images representing different 3D objects) from a networked database via a communication interface. Or the computing device 400 may receive the input 440, such as an input image, from a user via the user interface.

In some embodiments, the 3D generation module 430 is configured to generate 3D object data using a single image depicting a visible surface of the 3D object, as described in FIGS. 1-3. The 3D generation module 430 may further include a 3D representation submodule 431, an image constrained radiance fields submodule 432, a text-conditioned diffusion submodule 433 and a rendering submodule 434.

Specifically, given an input image, the 3D representation submodule 431 (e.g., similar to 3D model 110 in FIG. 2) generates a 3D representation such as the original radiance fields. The image constrained radiance fields submodule 432 generates image constrained radiance fields (e.g., 116 in FIG. 2). The text conditioned DDM submodule 433 (e.g., similar to 130 in FIG. 2) may then infer the unknown density and color regions for the reference views. The rendering submodule 434 may then generate a visualization (e.g., output 450) of the 3D representation of a 3D object.

In one embodiment, the 3D generation module 430 and its submodules 431-234 may be implemented by hardware, software and/or a combination thereof.

Some examples of computing devices, such as computing device 400 may include non-transitory, tangible, machine readable media that include executable code that when run by one or more processors (e.g., processor 410) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 5:
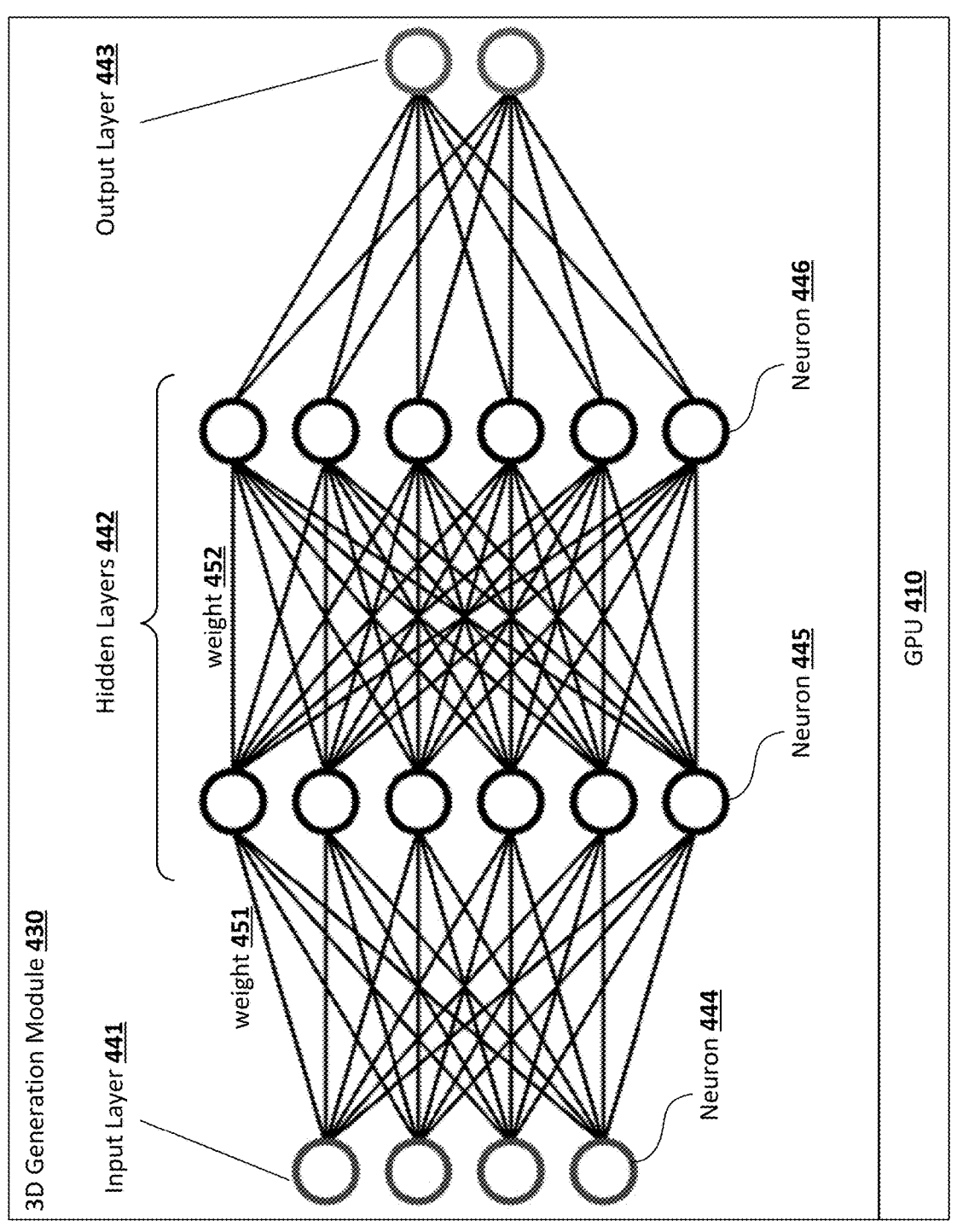
FIG. 5 is a simplified diagram illustrating a neural network structure implementing the 3D generation module described in FIG. 4, according to one embodiment described herein.

FIG. 5 is a simplified diagram illustrating a neural network structure implementing the 3D generation module 430 described in FIG. 4, according to one embodiment described herein. In one embodiment, the 3D generation module 430 and/or one or more of its submodules 431-234 may be implemented via an artificial neural network structure shown in FIG. 4B. The neural network comprises a computing system that is built on a collection of connected units or nodes, referred to as neurons (e.g., 444, 445, 446). Neurons are often connected by edges, and an adjustable weight is often associated with the edge. The neurons are often aggregated into layers such that different layers may perform different transformations on the respective input and output transformed input data onto the next layer.

For example, the neural network architecture may comprise an input layer 441, one or more hidden layers 442 and an output layer 443. Each layer may comprise a plurality of neurons, and neurons between layers are interconnected according to a specific topology of the neural network topology. The input layer 441 receives the input data (e.g., 440 in FIG. 4A), which pixel values representing an input image. The number of nodes (neurons) in the input layer 441 may be determined by the dimensionality of the input data (e.g., the length of a vector of pixel values of the input image). Each node in the input layer represents a feature or attribute of the input.

The hidden layers 442 are intermediate layers between the input and output layers of a neural network. It is noted that two hidden layers 442 are shown in FIG. 4B for illustrative purpose only, and any number of hidden layers may be utilized in a neural network structure. Hidden layers 442 may extract and transform the input data through a series of weighted computations and activation functions.

For example, as discussed in FIG. 4, the 3D generation module 430 receives an input 440 of an input image (or in the form of pixel values of the input image) and transforms the input into an output 450 of 3D image data. To perform the transformation, each neuron receives input signals, performs a weighted sum of the inputs according to weights assigned to each connection (e.g., 451, 452), and then applies an activation function associated with the respective neuron to the result. The output of the activation function is passed to the next layer of neurons or serves as the final output of the network. The activation function may be the same or different across different layers. Example activation functions include but not limited to Sigmoid, hyperbolic tangent, Rectified Linear Unit (ReLU), Leaky ReLU, Softmax, and/or the like. In this way, after a number of hidden layers, input data received at the input layer 441 is transformed into rather different values indicative data characteristics corresponding to a task that the neural network structure has been designed to perform.

The output layer 443 is the final layer of the neural network structure. It produces the network's output or prediction based on the computations performed in the preceding layers (e.g., 441, 442). The number of nodes in the output layer depends on the nature of the task being addressed. For example, in a binary classification problem, the output layer may consist of a single node representing the probability of belonging to one class. In a multi-class classification problem, the output layer may have multiple nodes, each representing the probability of belonging to a specific class.

Therefore, the 3D generation module 430 and/or one or more of its submodules 431-234 may comprise the transformative neural network structure of layers of neurons, and weights and activation functions describing the non-linear transformation at each neuron. Such a neural network structure is often implemented on one or more hardware processors 410, such as a graphics processing unit (GPU). An example neural network may be Instant-NGP that comprises a common multi-resolution hash encoding and two separate small multilayer perceptron, and/or the like.

In one embodiment, the neural network based 3D generation module 430 and one or more of its submodules 431-234 may be trained by iteratively updating the underlying parameters (e.g., weights 451, 452, etc., and/or coefficients in the activation functions associated with neurons) of the neural network based on the loss described in Eq. (7)-(11). For example, during forward propagation, the training data such as 3D images are fed into the neural network. The data flows through the network's layers 441, 442, with each layer performing computations based on its weights, biases, and activation functions until the output layer 443 produces the network's output 450.

The output generated by the output layer 443 is compared to the expected output (e.g., a "ground-truth" such as the corresponding 3D object for an input training 3D image) from the training data, to compute a loss function that measures the discrepancy between the predicted output and the expected output. For example, the loss function may be the depth loss described in Eq. (8). Given the loss computed according to Eq. (7)-(11), the negative gradient of the loss function is computed with respect to each weight of each layer individually. Such negative gradient is computed one layer at a time, iteratively backward from the last layer 443 to the input layer 441 of the neural network. These gradients quantify the sensitivity of the network's output to changes in the parameters. The chain rule of calculus is applied to efficiently calculate these gradients by propagating the gradients backward from the output layer 443 to the input layer 441.

Parameters of the neural network are updated backwardly from the last layer to the input layer (backpropagating) based on the computed negative gradient using an optimization algorithm to minimize the loss. The backpropagation from the last layer 443 to the input layer 441 may be conducted for a number of training samples in a number of iterative training epochs. In this way, parameters of the neural network may be gradually updated in a direction to result in a lesser or minimized loss, indicating the neural network has been trained to generate a predicted output value closer to the target output value with improved prediction accuracy. Training may continue until a stopping criterion is met, such as reaching a maximum number of epochs or achieving satisfactory performance on the validation data. At this point, the trained network can be used to make predictions on new, unseen data.

Therefore, the training process transforms the neural network into an "updated" trained neural network with updated parameters such as weights, activation functions, and biases. The trained neural network thus improves neural network technology in 3D object reconstruction.

Figure 6:
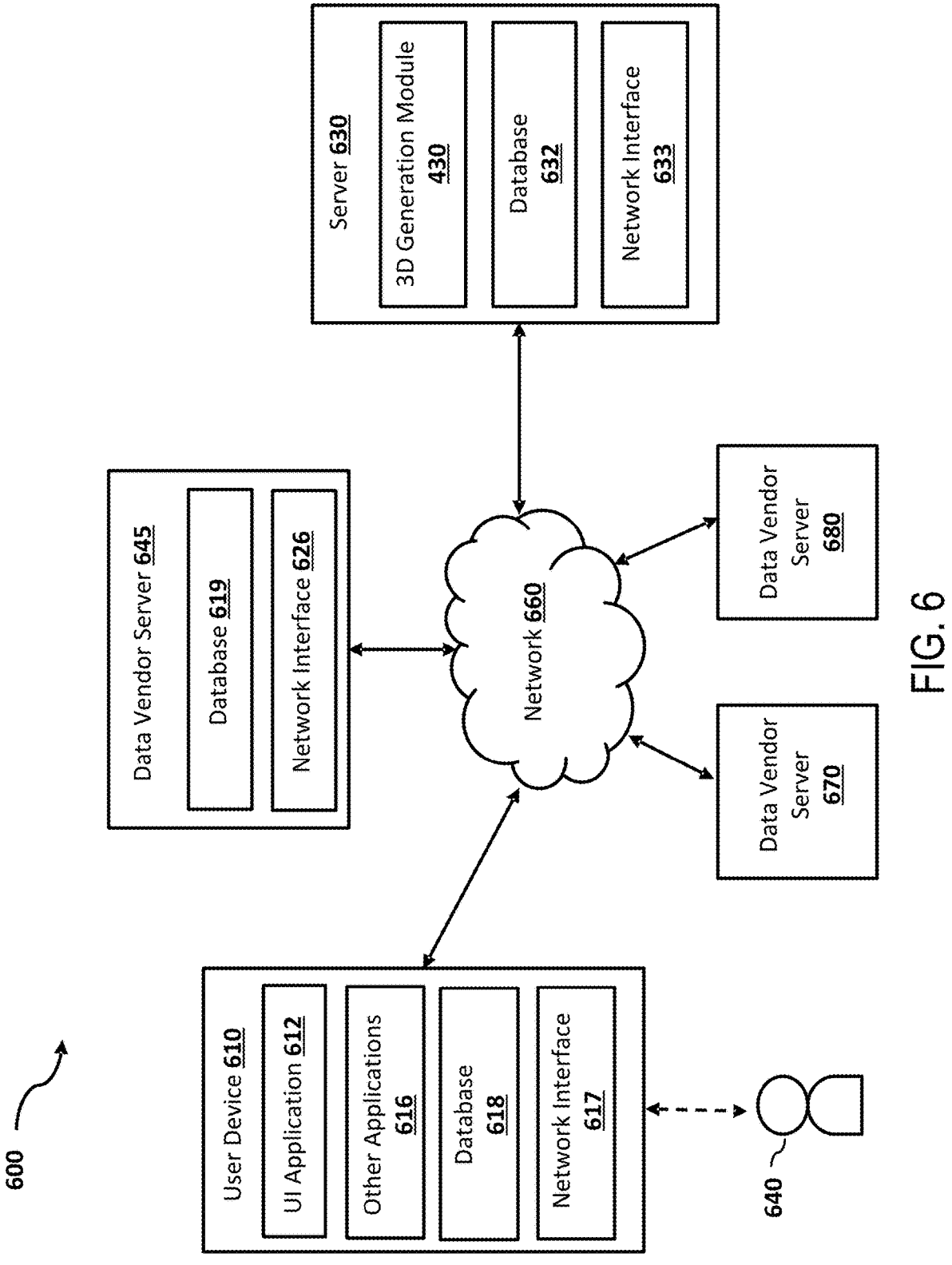
FIG. 6 is a simplified block diagram of a networked system suitable for implementing the 3D reconstruction framework described in FIGS. 1-5 and other embodiments described herein.

FIG. 6 is a simplified block diagram of a networked system 300 suitable for implementing the 3D reconstruction framework described in FIGS. 1-2 and other embodiments described herein. In one embodiment, system 600 includes the user device 610 which may be operated by user 640, data vendor servers 645, 670 and 680, server 630, and other forms of devices, servers, and/or software components that operate to perform various methodologies in accordance with the described embodiments. Exemplary devices and servers may include device, stand-alone, and enterprise-class servers which may be similar to the computing device 200 described in FIG. 2, operating an OS such as a MICROSOFT® OS, a UNIX® OS, a LINUX® OS, or other suitable device and/or server-based OS. It can be appreciated that the devices and/or servers illustrated in FIG. 6 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 610, data vendor servers 645, 670 and 680, and the server 630 may communicate with each other over a network 660. User device 610 may be utilized by a user 640 (e.g., a driver, a system admin, etc.) to access the various features available for user device 610, which may include processes and/or applications associated with the server 630 to receive an output data anomaly report.

User device 610, data vendor server 645, and the server 630 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 600, and/or accessible over network 660.

User device 610 may be implemented as a communication device that may utilize appropriate hardware and software configured for wired and/or wireless communication with data vendor server 645 and/or the server 630. For example, in one embodiment, user device 610 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 610 of FIG. 6 contains a user interface (UI) application 612, and/or other applications 616, which may correspond to executable processes, procedures, and/or applications with associated hardware. For example, the user device 610 may receive a message indicating 3D data representing the target 3D object from the server 630 and display the message via the UI application 612. For example, the output target 3D object 250 may comprise different views of the object, which are displayed via the UI application 612. In other embodiments, user device 610 may include additional or different modules having specialized hardware and/or software as required, such as a 3D printer that is configured to generate the target 3D object based on the output target 3D object data 250.

In various embodiments, user device 610 includes other applications 616 as may be desired in particular embodiments to provide features to user device 610. For example, other applications 616 may include security applications for implementing client-side security features, programmatic client applications for interfacing with appropriate application programming interfaces (APIs) over network 660, or other types of applications. Other applications 616 may also include communication applications, such as email, texting, voice, social networking, and IM applications that allow a user to send and receive emails, calls, texts, and other notifications through network 660. For example, the other application 616 may be an email or instant messaging application that receives a prediction result message from the server 630. Other applications 616 may include device interfaces and other display modules that may receive input and/or output information. For example, other applications 616 may contain software programs for asset management, executable by a processor, including a graphical user interface (GUI) configured to provide an interface to the user 640 to view the 3D views of the target 3D object.

User device 610 may further include database 618 stored in a transitory and/or non-transitory memory of user device 610, which may store various applications and data and be utilized during execution of various modules of user device 610. Database 618 may store user profile relating to the user

640, predictions previously viewed or saved by the user 640, historical data received from the server 630, and/or the like. In some embodiments, database 618 may be local to user device 610. However, in other embodiments, database 618 may be external to user device 610 and accessible by user device 610, including cloud storage systems and/or databases that are accessible over network 660.

User device 610 includes at least one network interface component 617 adapted to communicate with data vendor server 645 and/or the server 630. In various embodiments, network interface component 617 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 645 may correspond to a server that hosts database 619 to provide training datasets including training input images corresponding to different 3D objects to the server 630. The database 619 may be implemented by one or more relational database, distributed databases, cloud databases, and/or the like.

The data vendor server 645 includes at least one network interface component 626 adapted to communicate with user device 610 and/or the server 630. In various embodiments, network interface component 626 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 645 may send asset information from the database 619, via the network interface 626, to the server 630.

The server 630 may be housed with the 3D generation module 430 and its submodules described in FIG. 4. In some implementations, 3D generation module 230 may receive data from database 619 at the data vendor server 645 via the network 660 to generate 3D object data. The generated 3D object data may also be sent to the user device 610 for review by the user 640 via the network 660.

The database 632 may be stored in a transitory and/or non-transitory memory of the server 630. In one implementation, the database 632 may store data obtained from the data vendor server 645. In one implementation, the database 632 may store parameters of the 3D generation module 230. In one implementation, the database 632 may store previously generated 3D data, and the corresponding input feature vectors.

In some embodiments, database 632 may be local to the server 630. However, in other embodiments, database 632 may be external to the server 630 and accessible by the server 630, including cloud storage systems and/or databases that are accessible over network 660.

The server 630 includes at least one network interface component 633 adapted to communicate with user device 610 and/or data vendor servers 645, 670 or 680 over network 660. In various embodiments, network interface component 633 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 660 may be implemented as a single network or a combination of multiple networks. For example, in various embodiments, network 660 may include the Internet or one or more intranets, landline networks, wireless networks, and/or other appropriate types of networks. Thus, network 660 may correspond to small scale communication networks, such as a private or local area network, or a larger scale network, such as a wide area network or the Internet, accessible by the various components of system 600.

FIG. 7 is a simplified block diagram illustrating an example pseudo-code segment for optimizing an image constrained 3D representation using the framework in FIG. 2, according to embodiments described herein. In one embodiment, for an input image, Instant-NGP may be used as the base representation comprising of a shared multi-resolution hash encoding and two separate small MLPs for the unconstrained color $c(x)$ and density $\sigma(x)$ respectively (line 1 of Algorithm 1).

The reference view camera may be chosen to lie at a distance of 3.2 from origin, azimuth angle 0 and elevation 0 except where specified. Reference rays may be computed for the camera corresponding to this reference view (line 2 of Algorithm 1), or may be precomputed and retrieved.

Textual Inversion may be adopted to use input images (e.g., 102) and a diffusion model (e.g., 130) to infer the text embedding of a special token ("<token>") in the text prompt (e.g., 122). This token along with its learned embedding can be passed to the diffusion model to synthesize novel images of the same object. For example, 3 to 5 images are used to accurately capture an object. The images may be obtained by synthetically augmenting the single input image (e.g., 102) to run Textual Inversion, e.g., by randomly flipping horizontally with probability 0.5, extract a random crop covering 50% to 100% of the image, Gaussian blurring the image with a kernel size 5 and standard deviation randomly sampled in [0.1, 2] and jittering the hue, saturation, contrast and brightness by a random value in [0, 0.1]. Furthermore, classification of the input image is performed using a pretrained CLIP model. The text embedding of the obtained class label is used to initialize the embedding of the special token "<token>" (line 3 of Algorithm 1).

For each update, the Visibility Depth may be estimated by evaluating on points along these rays and choosing the closest solution (line 5 of Algorithm 1). The estimated reference view depth $D_{\hat{p}}$ is computed using the precomputed rays and radiance field density $\sigma'(x)$ (line 6 of Algorithm 1). The gradient of the Depth Loss $D_p$ is then computed (line 7 of Algorithm 1).

A random camera pose p is obtained by uniformly sampling elevation angle in [−15, 45], azimuth angle in [0, 360°] and distance to origin in [3, 3.5] (line 8 of Algorithm 1). Then the image for $I_p$ is rendered for this viewpoint using the constrained color $c'(x)$ and density $\sigma'(x)$ (lines 9-10 of Algorithm 1). The SDS sampling update may be computed using $I_p$, text embedding and diffusion model (line 11 of Algorithm 1).

Additionally, the regularization losses (e.g., $\mathcal{L}_{ent}$, $\mathcal{L}_{orient}$, $\mathcal{L}_{smooth}$ are adopted to enforce smoothness of surface normals and encourage outward facing surface normal in the radiance field (lines 12-14 of Algorithm 1). The parameters of the 3D model are then updated according to a weighted sum of the losses (line 15 of Algorithm 1).

In one embodiment, the image of the reference view may not need to be rendered during training. This eliminates the need for tuning viewpoint sampling strategies and additional reference loss hyperparameters, leading to a simpler and more robust training pipeline. Computation of visibility depth also does not significantly increase GPU memory consumption since we do not compute its gradients.

In one embodiment, Algorithm 1 may be implemented on an Adan optimizer with 0.005 learning rate and weight decay of 0.00002. A batch size of 1 for each update i.e. one random viewpoint, may be used. Using the same learning rate, the representation may be updated for 5000 updates. The optimization process takes approximately 20 minutes on a single A100 GPU.

Figure 8B:
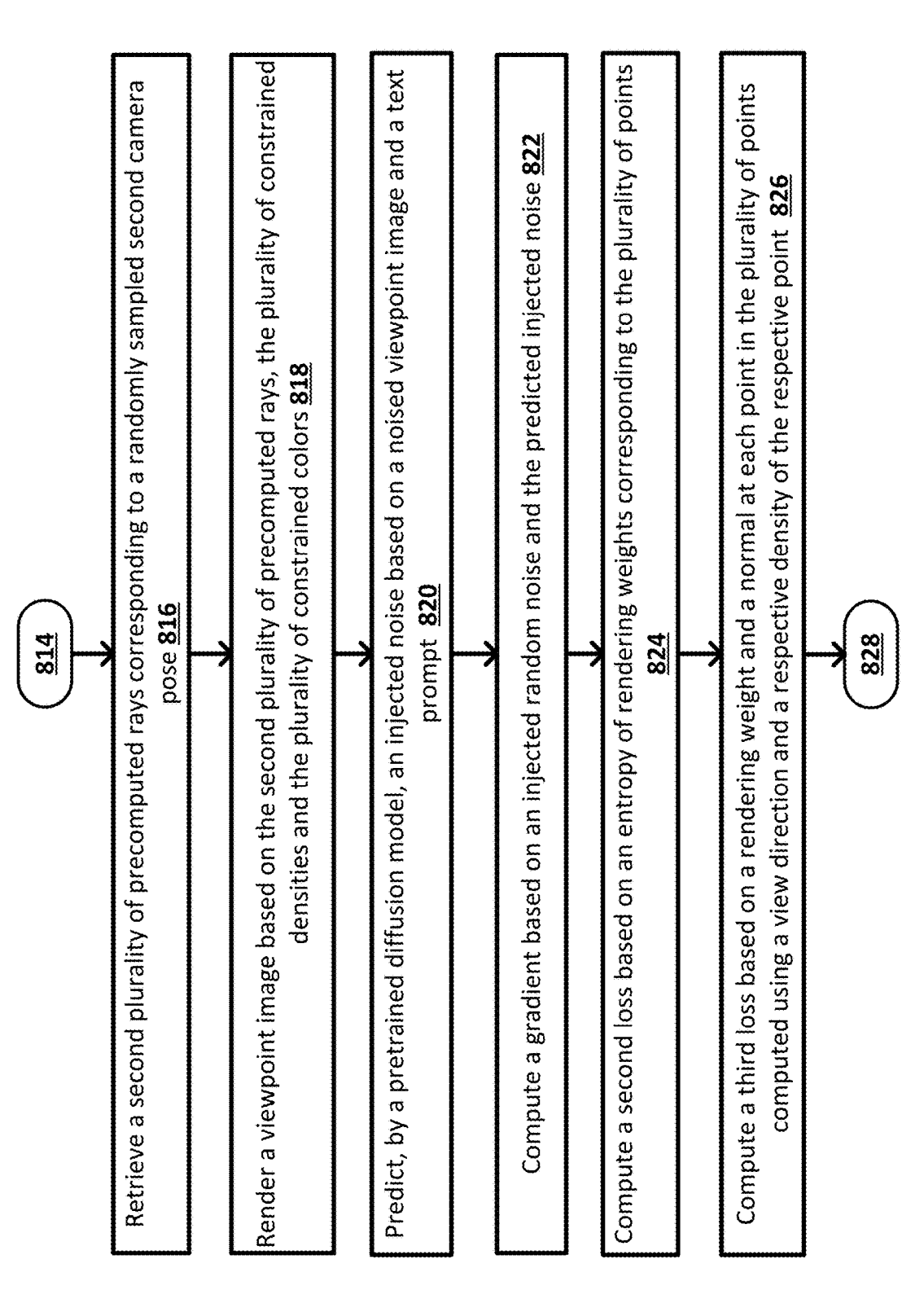

FIGS. 8A-8C provides an example logic flow diagram illustrating a method of 3D object reconstruction using a single input image of a target 3D object shown in FIGS. 1-7, according to some embodiments described herein. One or more of the processes of method 800 may be implemented, at least in part, in the form of executable code stored on non-transitory, tangible, machine-readable media that when run by one or more processors may cause the one or more processors to perform one or more of the processes. In some embodiments, method 500 corresponds to the operation of the 3D generation module 430 (e.g., FIGS. 4-6) that performs 3D representation generation. For ease of illustration, method 800 is illustrated in view of FIGS. 8A-8C.

As illustrated, the method 800 includes a number of enumerated steps, but aspects of the method 500 may include additional steps before, after, and in between the enumerated steps. In some aspects, one or more of the enumerated steps may be omitted or performed in a different order.

At step 802, a reference view (e.g., 108 in FIG. 1) of the target 3D object corresponding to a first camera pose may be generated from the single input image (e.g., 102 in FIG. 1). For example, the reference view comprise a first set of points between a reference camera corresponding to the first camera pose and a visible surface of the target 3D object, and a second set of points belonging to the visible surface. The first set of points are assigned zero density, and the second set of points are assigned densities and colors equivalent to corresponding pixels in the input image.

At step 804, a 3D neural network model (e.g., 110 in FIG. 2) may generate a 3D representation (e.g., 115 in FIG. 2) of the target 3D object comprising a plurality of colors and a plurality of densities corresponding to a plurality of points, based on the reference view.

At step 806, a first estimated visibility depth indicating a range along a first plurality of rays that restrain a color contribution from the first point, may be generated, for at least one point in the reference view, based on a first density corresponding to the first point, e.g., according to Eq. (2). For example, the first plurality of rays are precomputed and stored corresponding to the first camera pose.

At step 808, the plurality of colors and the plurality of densities for the plurality of points may be constrained based at least in part on estimated visibility depths. For example, the plurality of colors are constrained based on pixel values in the input image that correspond to points between a reference camera and an estimated surface along the first plurality of rays, e.g., Eq. (4). The plurality of densities are constrained based on a foreground mask of the input image, e.g., Eq. (5)(6).

At step 810, a user interface (e.g., 106 in FIG. 1) may output a visualization (e.g., 117 in FIG. 1) of the target 3D object based on constrained 3D representation comprising the plurality of constrained colors and the plurality of constrained densities. For example, the visualization may comprise rendering a viewpoint image of the target 3D object based on the plurality of constrained colors and the plurality of constrained densities and a user-selected camera pose.

At step 812, a depth map may be generated along the first plurality of rays based on the plurality of constrained densities.

At step 814, a first loss (e.g., depth loss) may be computed based on the generated depth map and an estimated depth map from the input image.

At step 816, a second camera pose may be randomly sampled, and a second plurality of precomputed rays may be retrieved corresponding to the second camera pose.

At step 818, a viewpoint image (e.g., 121 in FIG. 2) may be rendered based on the second plurality of precomputed rays, the plurality of constrained densities and the plurality of constrained colors.

At step 820, a pretrained diffusion model (e.g., 130 in FIG. 2) may predict an injected noise (e.g., 133 in FIG. 2) based on a noised viewpoint image and a text prompt (e.g., 122 in FIG. 2).

At step 822, a gradient may be computed based on an injected random noise and the predicted injected noise, e.g., Eq. (7).

At step 824, a second loss may be computed based on an entropy of rendering weights corresponding to the plurality of points, e.g., Eq. (8).

At step 826, a third loss may be computed based on a rendering weight and a normal at each point in the plurality of points computed using a view direction and a respective density of the respective point, e.g., Eq. (9).

At step 828, a fourth loss may be computed based on a difference between a first normal at each point and a second normal at a perturbed distance from the respective point, e.g., Eq. (10).

At step 830, a combined gradient based on the gradient and a weight sum of the first loss, the second loss, the third loss and the fourth loss, e.g., Eq. (11).

At step 832, the 3D neural network model (e.g., 110 in FIG. 2) may be updated using the combined gradient. Additional details of updating a neural network based on a loss may be described in FIG. 5.

At step 834, the user interface may update the visualization of the target 3D object based on updated 3D representation generated by the updated 3D neural network model, e.g., the updated constrained colors and the updated densities.

FIG. 9 provides a performance chart comparing the image constrained radiance fields 116 with existing 3D representations, according to embodiments described herein. The task of image to 3D generation is difficult to quantitatively evaluate due to the inherent ambiguity in the expected output i.e. there are several possible realistic reconstructions of the same object. NeuralLift360 evaluates the ability to capture semantic content by measuring the CLIP feature distance between all viewpoints of the generated object and the single input reference image.

In a data experiment, 20 objects are rendered from 10 categories of the ShapeNet dataset viewed from 68 different camera poses to create a ground truth (GT) set. A front-facing view from each object is chosen as input to an Image-to-3D approach. The generated object is rendered from the same 68 camera poses. Due to ambiguity of depth, corresponding camera poses between GT and rendered images could depict very different object poses. Using these two sets of images, three metrics are used –$d_{ref}$ is the mean CLIP feature distance between the reference image and all the rendered viewpoints; $d_{all}$ is the mean CLIP feature distance between all pairs of GT and rendered images; $d_{oracle}$ is the solution to a linear sum assignment problem where the cost of assigning a GT view to a rendered image is the CLIP feature distance between them. This evaluates the ability of the representation to generate images as diverse as the ground truth while preserving semantic content. These three metrics are evaluated for the two sets of 68 images ("All Views"). A subset of camera poses that lie within a 15 elevation change and 45° azimuth change ("Near Reference") giving us 15 images each for ground truth and rendered images are also used for evaluation. This measures the semantic consistency in viewpoints where parts of the input image are visible.

As shown in FIG. 9, the image constrained 3D representation (referred to as "ConRad") is compared to RealFusion (Melas et al., Realfusion: 360 reconstruction of any object from a single image, arXiv preprint arXiv:2302.10663, 2023), NeuralLift360 (Xu et al., Neurallift-360: Lifting an in-the-wild 2d photo to a 3d object with 360 views, arXiv preprint arXiv:2211.16431, 2022), and PointE (Nichol et al., "Point-E: A system for generating 3d point clouds from complex prompts," arXiv preprint arXiv:2212.08751, 2022). PointE is a point cloud diffusion model was trained on several million 3D models. It can directly generate point clouds using CLIP features of the input image. Since there is no corresponding reference view in the output, we synthesize 150 random views for PointE instead of the 68 chosen views. It is observed that ConRad outperforms these methods across all the metrics by a significant margin.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A method of three-dimensional (3D) object reconstruction using a single input image of a target 3D object, the method comprising:
   generating, from the single input image, a reference view of the target 3D object corresponding to a first camera pose;
   generating, for a 3D neural network model, a 3D representation of the 3D object comprising a plurality of colors and a plurality of densities corresponding to a plurality of points, based on the reference view;
   generating, for at least one point in the reference view, a first estimated visibility depth indicating a range along a first plurality of rays that restrain a color contribution from the first point, based on a first density corresponding to the first point;
   constraining, based at least in part on estimated visibility depths, the plurality of colors and the plurality of densities for the plurality of points to generate a constrained 3D representation of the target 3D object prior to performing any training of the 3D neural network model;
   training, after the constraining, the 3D neural network model based on the constrained 3D representation; and
   outputting, via a user interface, a visualization of the target 3D object based on constrained 3D representation comprising the plurality of constrained colors and the plurality of constrained densities.

2. The method of claim 1, wherein the reference view comprise a first set of points between a reference camera corresponding to the first camera pose and a visible surface of the target 3D object, and a second set of points belonging to the visible surface, and
   wherein the first set of points are assigned zero density, and the second set of points are assigned densities and colors equivalent to corresponding pixels in the input image.

3. The method of claim 1, wherein the first plurality of rays are precomputed and stored corresponding to the first camera pose.

4. The method of claim 1, wherein each constrained color for the plurality of colors is obtained based on: (i) pixel values in the input image that correspond to points between a reference camera and (ii) an estimated surface along the first plurality of rays and a bilinear interpolation of the pixel values.

5. The method of claim 1, wherein each constrained density for the plurality of densities is obtained based on a foreground mask of the input image applied on a camera projection matrix corresponding to a projection from world coordinates to normalized reference image coordinates.

6. The method of claim 1, wherein the outputting, via the user interface, the visualization of the target 3D object comprises:
   rendering a viewpoint image of the target 3D object based on the plurality of constrained colors and the plurality of constrained densities and a first user-selected camera pose.

7. The method of claim 1, wherein the training of the 3D neural network model comprises:
   generating a depth map along the first plurality of rays based on the plurality of constrained densities;
   computing a first loss based on the generated depth map and an estimated depth map from the input image; and
   updating the 3D neural network model using a combined gradient that includes the first loss.

8. The method of claim 7, further comprising:
generating, by the updated 3D neural network model, an updated 3D representation;
generating updated constrained colors and updated densities from the updated 3D representation; and
updating, via the user interface, the visualization of the target 3D object based on the updated constrained colors and the updated densities.

9. A system for three-dimensional (3D) object reconstruction using a single input image of a target 3D object, the system comprising:
a memory storing a 3D neural network model and a plurality of processor-executed instructions; and
one or more processors executing the plurality of processor-executed instructions to perform operations comprising:
generating, from the single input image, a reference view of the target 3D object corresponding to a first camera pose;
generating, for a 3D neural network model, a 3D representation of the 3D object comprising a plurality of colors and a plurality of densities corresponding to a plurality of points, based on the reference view;
generating, for at least one point in the reference view, a first estimated visibility depth indicating a range along a first plurality of rays that restrain a color contribution from the first point, based on a first density corresponding to the first point;
constraining, based at least in part on estimated visibility depths, the plurality of colors and the plurality of densities for the plurality of points to generate a constrained 3D representation of the target 3D object prior to performing any training of the 3D neural network model;
training, after the constraining, the 3D neural network model based on the constrained 3D representation; and
outputting, via a user interface, a visualization of the target 3D object based on constrained 3D representation comprising the plurality of constrained colors and the plurality of constrained densities.

10. The system of claim 9, wherein the reference view comprise a first set of points between a reference camera corresponding to the first camera pose and a visible surface of the target 3D object, and a second set of points belonging to the visible surface, and
wherein the first set of points are assigned zero density, and the second set of points are assigned densities and colors equivalent to corresponding pixels in the input image.

11. The system of claim 9, wherein the first plurality of rays are precomputed and stored corresponding to the first camera pose.

12. The system of claim 9, wherein each constrained color for the plurality of colors is obtained based on: (i) pixel values in the input image that correspond to points between a reference camera and an estimated surface along the first plurality of rays; and (ii) a bilinear interpolation of the pixel values.

13. The system of claim 9, wherein each constrained density for the plurality of densities is obtained based on a foreground mask of the input image applied on a camera projection matrix corresponding to a projection from world coordinates to normalized reference image coordinates.

14. The system of claim 9, wherein the operation of outputting, via the user interface, the visualization of the target 3D object comprises:

rendering a viewpoint image of the target 3D object based on the plurality of constrained colors and the plurality of constrained densities and a first user-selected camera pose.

15. The system of claim 9, wherein the training of the 3D neural network model further comprises:
generating a depth map along the first plurality of rays based on the plurality of constrained densities;
computing a first loss based on the generated depth map and an estimated depth map from the input image; and
updating the 3D neural network model using a combined gradient that includes the first loss.

16. The system of claim 15, wherein the operations further comprise:
generating, by the updated 3D neural network model, an updated 3D representation;
generating updated constrained colors and updated densities from the updated 3D representation; and
updating, via the user interface, the visualization of the target 3D object based on the updated constrained colors and the updated densities.

17. A non-transitory processor-readable storage medium storing a plurality of processor executed instructions for three-dimensional (3D) object reconstruction using a single input image of a target 3D object, the plurality of processor-executed instructions being executed by one or more processors to perform operations comprising:
generating, from the single input image, a reference view of the target 3D object corresponding to a first camera pose;
generating, for a 3D neural network model, a 3D representation of the 3D object comprising a plurality of colors and a plurality of densities corresponding to a plurality of points, based on the reference view;
generating, for at least one point in the reference view, a first estimated visibility depth indicating a range along a first plurality of rays that restrain a color contribution from the first point, based on a first density corresponding to the first point;
constraining, based at least in part on estimated visibility depths, the plurality of colors and the plurality of densities for the plurality of points to generate a constrained 3D representation of the target 3D object prior to performing any training of the 3D neural network model;
training, after the constraining, the 3D neural network model based on the constrained 3D representation; and
outputting, via a user interface, a visualization of the target 3D object based on constrained 3D representation comprising the plurality of constrained colors and the plurality of constrained densities.

18. The medium of claim 1, wherein the reference view comprise a first set of points between a reference camera corresponding to the first camera pose and a visible surface of the target 3D object, and a second set of points belonging to the visible surface, and
wherein the first set of points are assigned zero density, and the second set of points are assigned densities and colors equivalent to corresponding pixels in the input image.

19. The medium of claim 1, wherein each constrained color for the plurality of colors is obtained based on: (i) pixel values in the input image that correspond to points between a reference camera and an estimated surface along the first plurality of rays; and (ii) a bilinear interpolation of the pixel values.

20. The medium of claim 1, wherein each constrained density for the plurality of densities is obtained based on a foreground mask of the input image applied on a camera projection matrix corresponding to a projection from world coordinates to normalized reference image coordinates.

\* \* \* \* \*